United States Patent [19]

Hohmann et al.

[11] Patent Number: 4,492,790
[45] Date of Patent: Jan. 8, 1985

[54] VAT DYESTUFFS OF THE TRISANTHRAQUINONYLAMINOTRIAZINE SERIES

[75] Inventors: Walter Hohmann; Klaus Wunderlich, both of Leverkusen, Fed. Rep. of Germany

[73] Assignee: Bayer Aktiengesellschaft, Leverkusen, Fed. Rep. of Germany

[21] Appl. No.: 339,943

[22] Filed: Jan. 18, 1982

[30] Foreign Application Priority Data

Jan. 31, 1981 [DE] Fed. Rep. of Germany ....... 3103258

[51] Int. Cl.³ .................. C07D 401/12; C07D 401/14
[52] U.S. Cl. .................................................... 544/188
[58] Field of Search ........................................ 544/188

[56] References Cited

U.S. PATENT DOCUMENTS 1,568,627  1/1926  Schetelig .............................. 544/188
1,719,792  7/1929  Ackermann et al. ................. 544/188
4,329,456  5/1982  Tzikas ................................. 544/188

FOREIGN PATENT DOCUMENTS 390201   2/1924   Fed. Rep. of Germany .
590163  12/1933   Fed. Rep. of Germany .
104012   3/1923   Switzerland .
874620   5/1958   United Kingdom .

*Primary Examiner*—John M. Ford
*Attorney, Agent, or Firm*—Sprung, Horn, Kramer & Woods

[57] ABSTRACT

Vat dyestuffs containing at least 80% by weight of one or more of the compounds of the formula

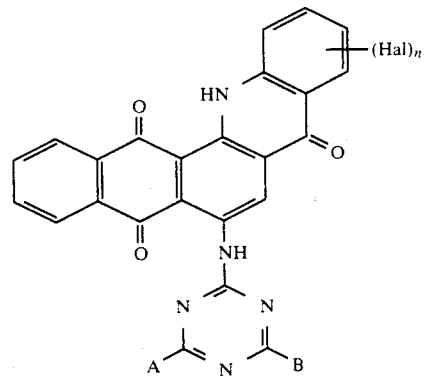

wherein A and B independently of one another represent —NHV, —NHW or —NHZ, in which
V represents a radical of the formula

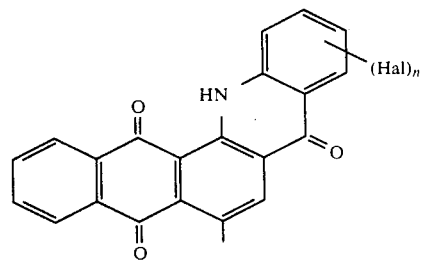

W represents a radical of the formula

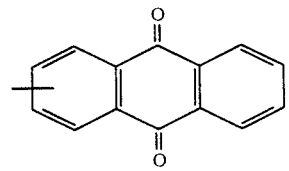

and Z represents a radical of the formula

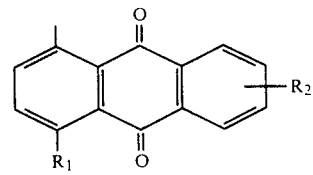

$R_1$ and $R_2$ denote hydrogen or acylamino, but do not simultaneously denote acylamino,
Hal denotes a halogen atom and
n denotes the numbers 0, 1 or 2, yield deep and light-fast dyeings on cellulose fibres.
They are advantageously obtained by the stepwise condensation of cyanuric chloride with corresponding aminoanthraquinones in the presence of a phenol.

4 Claims, No Drawings

VAT DYESTUFFS OF THE TRISANTHRAQUINONYLAMINOTRIAZINE SERIES

The invention relates to vat dyestuffs containing as the dyestuff component at least 80, preferably at least 90, % by weight of one or more compounds of the formula

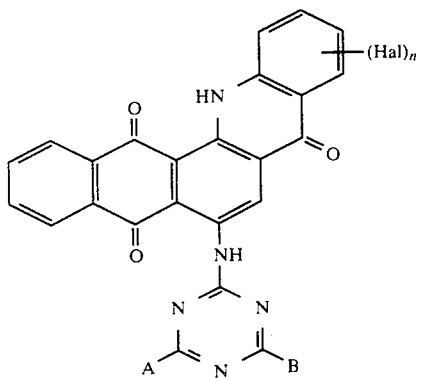

wherein A and B independently of one another represent —NHV, —NHW or —NHZ,
in which
V represents a radical of the formula

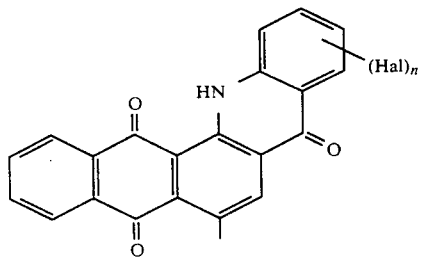

W represents a radical of the formula

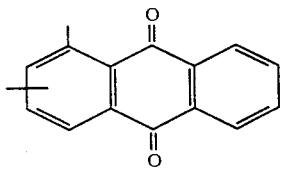

and Z represents a radical of the formula

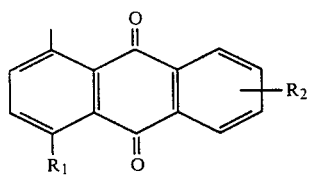

$R_1$ and $R_2$ denote hydrogen or acylamino, but do not simultaneously denote acylamino,
Hal denotes a halogen atom and
n denotes the numbers 0, 1 or 2.

The dyestuff components of the formula I can be prepared by various processes.

One process is characterised by reacting 1 equivalent of cyanuric chloride with at least 1 equivalent of an amine of the formula $NH_2$—V and at most 2 equivalents of the amines $NH_2$—W and/or $NH_2$—Z in optional sequence, by methods which are in themselves known, until chlorine replacement is virtually complete.

A variant for the introduction of the radical Z consists in reacting a diaminoanthraquinone with cyanuric chloride, a dichlorotriazine or a monochlorotriazine in such a way that only one amino group reacts and then acylating the unreacted amino group by methods which are in themselves known.

In carrying out the process in a stepwise manner, the first step preferably consists in reacting the amine which has the lowest molecular weight.

The replacement of the first two chlorine atoms can be carried out in customary solvents which are inert under the reaction conditions.

Suitable inert solvents for carrying out the first step are nitrobenzene, chlorobenzene, dichlorobenzene, naphthalene and similar compounds.

The reaction temperatures for the replacement of one chlorine atom of the cyanuric chloride lie between 100° and 150° C., preferably 130° and 140° C. In order to prepare diaminotriazines, higher temperatures are required: 160°–210° C., preferably 180°–200° C. In order to achieve complete chlorine replacement, the reaction must be carried out in the presence of aromatic hydroxy compounds (see German Patent Specification No. 590,163).

Suitable hydroxy compounds for the complete chlorine replacement are phenol, chlorophenols, cresols, naphthols and the like. Ordinary phenol is preferred.

The reaction in these phenols is carried out at 110°–150° C., preferably at 120°–145° C. The amounts of phenol used are preferably 10 to 30 times the amount of cyanuric chloride required for the dyestuffs.

It is particularly advantageous to prepare the dyestuff components (I) in a "one-vessel process".

In this process a phenol is employed from the start as the reaction medium and the mixture of reactants with an aminoanthraquinone is initially warmed to temperatures of 70°–110° C., preferably 80°–100° C., to achieve a monochloro or dichloro replacement and only after the addition of one and/or two other aminoanthraquinones is the temperature increased to 120°–150° C. until complete halogen replacement has taken place.

During the reaction its progress is monitored analytically in the customary manner.

As soon as the temperature/time grid has thus been determined on a small scale, the conditions established can be transferred directly to industrial largescale production. In order to "brighten" the reaction products, they can finally be subjected to a customary oxidative after-treatment.

Products which have very low "residual chlorine" values (that is to say less than 0.8%, preferably less than 0.4%) are surprisingly obtained under the reaction conditions according to the invention.

However, if the last step of the halogen replacement is carried out below 120° C., the "residual chlorine" content increases markedly and products of inferior quality, in particular of unsatisfactory wet fastness properties, are obtained.

On the other hand, increasing the temperature above 150° C. in the presence of phenols is also to be avoided, because already in this temperature range partial to complete chlorine/phenoxy replacement takes place.

Since under the conditions according to the invention virtually complete chlorine/amine replacement without using an excess of amine is possible, the dyestuffs can be obtained with optimum dyeing properties without additional purification operations. It is sufficient to remove the solvents used, for example by steam or vacuum distillation, in order to obtain the dyestuffs in sufficient purity and in a virtually quantitative yield. This is surprising because it is impossible, for example under the reaction conditions according to the invention, to achieve anything like complete replacement of the chlorine atoms of cyanuric chloride solely by 1-amino-5-benzylaminoanthraquinone.

The vat dyestuffs according to the invention dye cellulose fibres, in particular cotton, in very deep, clean shades of the most diverse hues, from the vat, by all customary dyeing methods.

Compared with the nearest comparable dyestuffs which are disclosed in German Patent Specification No. 590,163, the compounds of the formula I are distinguished by an improved fastness level.

Furthermore, the new dyestuff components of the formula I, in contrast to the known dyestuffs of Examples 1-6 of the patent specification mentioned, develop optimum colour intensity on dyeing from a warm liquor. They can therefore also be used without restrictions in modern continuous dyeing methods.

In contrast to the vat dyestuffs disclosed in German Patent Specification No. 390,201, which are partly prepared from the same starting materials, but by using different reaction conditions, the dyestuffs according to the invention have considerably lower "residual chlorine" values and hence a markedly improved resistance to alkali. They frequently have superior colour intensities and clearer hues.

Whereas, according to German Auslegeschrift No. 1, 073, 130, only the unsymmetrical pure dyestuffs have good properties and dyestuff mixtures have numerous disadvantages because their components differ very much in dye behaviour, the dyestuff mixtures according to the invention do not have these disadvantages, since at least one 3,4-phthaloylacridonylamino radical is present in them. Owing to the trifunctionality of cyanuric chloride and to the considerably superior selectivity of the replacement of chlorine by an aminoantrhaquinone radical (in comparison with the dichlorotriazines employed in German Auslegeschrift No. 1,073,130, such dyestuff mixtures can be readily prepared by the two-step temperature process in which all dyestuff molecules of the mixture contain at least one 3,4-phthaloylacridonylamino radical.

Thereby, in contrast to what applies with the starting materials used in German Auslegeschrift No. 1,073,130, the preparation of dyestuffs with virtually theoretical yield is possible in a one-vessel process. Whereas there only a molar ratio of 1:1 is possible for the amines, here it can be varied, for example in the ratio 1:1–2:1 in the case of a two-amine mixture, whereby very different hues can be achieved with the same amines.

Mixtures of compounds of the formula I, in particular those such as are obtained on condensing cyanuric chloride with a total of 3 mols (but preferably with a shortfall of up to about 10%) of a mixture of the amines V—NH$_2$, W—NH$_2$ and Z—NH$_2$ in the presence of aromatic hydroxy compounds at 90°–150° C., are industrially and economically more important than the pure dyestuff components, provided care is taken that at least 1 mol of the amine V—NH$_2$ is used.

Such dyestuff mixtures approximately correspond to the following formula

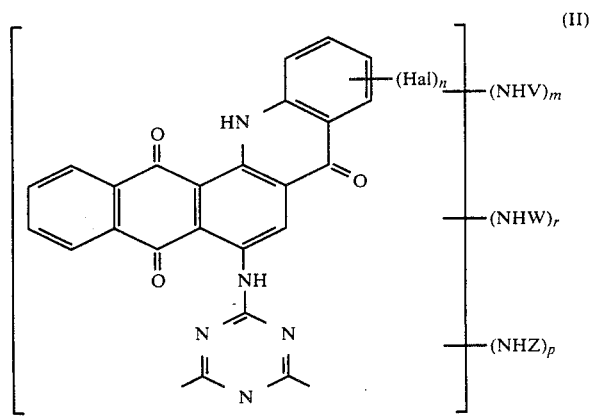

(II)

wherein the various radicals have the abovementioned meaning and m represents a number from 0 to 0.5 and
r and p independently of one another represent a number from 0.5 to 1.5, with the sum m+r+p being 2.

Mixtures of the formula II, wherein p is 0, m is 0 to 0.2 and r is 1.8–2.0, with the sum m+r being 2, are particularly preferred.

Those compounds are in turn preferred, with the scope of formulae I and II, in which n is 0 or 1, "Hal" is bromine and "acylamino" is C$_1$-C$_4$-alkylcarbonylamino or preferably benzoylamino which may be substituted by Cl, Br, C$_1$-C$_4$-alkyl, OCH$_3$, CF$_3$ or NO$_2$. In Z, R$_1$ preferably represents an acylamino radical.

It is particularly economical to use industrial mixtures of the amines of the formula W—NH$_2$ rather than their pure forms. Here the products in question are especially those which are obtained as a crude product in the factory-scale production of 1-nitroanthraquinone by nitrating anthraquinone and which are subsequently reduced.

It is particularly surprising that even mother liquors which contain nitroanthraquinone, and other waste products from the large-scale industrial purification of 1-nitroanthraquinone, can be used quite successfully as starting materials for the preparation of the amines.

Such waste products have approximately the following composition:

| | |
|---|---|
| 1-nitroanthraquinone: | <60%, preferably <45% |
| 2-nitroanthraquinone: | <40%, preferably <30% |
| 1,5-dinitroanthraquinone: | |
| 1,8-dinitroanthraquinone: | |
| 1,6-dinitroanthraquinone: | |
| 1,7-dinitroanthraquinone: | in total at least 30% |
| unsubstituted anthraquinone: | |
| others: | |

By reducing them with customary means, amine mixtures of corresponding composition are obtained, which can be used quite successfully instead of the pure amines W—NH$_2$ in the preparation of trisaminotriazines of the type claimed.

In this process, vat dyestuffs are obtained whose hues are remarkably reproducible and whose quality often not only approaches the quality of dyestuffs prepared by using pure starting materials but occasionally even surpasses it. This is particularly true with respect to the colour intensity.

If $R_1$ represents H and $R_2$ represents acylamine radicals in the formulae I and II, it is in some cases advantageous to use, instead of pure aminobenzoylaminoanthraquinones, their industrial mixtures. They can be obtained, for example using methods which are in themselves known, by reduction and subsequent partial acylation from dinitroanthraquinone mixtures as can be obtained as the crude product in the factory-scale production of dinitroanthraquinone by dinitrating anthraquinone or on subsequently purifying 1,5- and/or 1,8-dinitroanthraquinones, for example by the procedures of German Offenlegungsschriften Nos. 2,637,732 and 2,637,733, by isolation from the mother liquors.

Another possibility consists in reacting the diaminoanthraquinone mixtures themselves with cyanuric chloride or with its derivatives which still contain chlorine in such a way that only one amino group reacts and subsequently acylating the unreacted amino group with customary acylating agents by methods which are in themselves known.

The temperatures indicated in the following examples are in degrees centigrade.

EXAMPLE 1

37 g of cyanuric chloride (0.2 mol) are added at 60° to 75.8 g of 1-aminoanthraquinone (0.34 mol) in 690 ml of phenol. The mixture is warmed to 70°–75° in the course of 1 hour and is then stirred for 2 hours at 90°–95°. Thereafter, 1-amninoanthraquinone and cyanuric chloride are no longer detectable by chromatography. A removed sample contains 8.8% of chlorine.

89.9 g of 2-amino-3,4-phthaloyl-7-bromoacridone (0.215 mol) are now added, the mixture is warmed to 140° in the course of 1 hour and stirring is continued for a further 3 hours at the same temperature. Only a little 2-amino-3,4-phthaloyl-7-bromoacridone can still be detected in a removed sample. 750 ml of water are added, all the phenol is distilled off with steam, and the dyestuff suspension is filtered off with suction, washed with hot water and dried. Yield: 183 g.

After this dyestuff has been brought into a very finely divided form through customary finishing, it dyes cotton in a fast, deep olive-green shade, by all methods. The reproducibility of hue and colour intensity is shown to be very good in a series of experiments.

EXAMPLE 2

(a) 48 g of cyanuric chloride (0.26 mol) are added at 110° to 98 g of 7-bromo-3,4-phthaloyl-2-aminoacridone (0.24 mol) in 1,400 ml of dry nitrobenzene and the mixture is stirred for 2 hours at 130°. The mixture is diluted with 1,460 ml of methanol, stirring is continued for some time at 50°–60°, and the product is filtered off with suction, washed with methanol and dried. 125 g are obtained. This product contains 12.5% of chlorine and 14.1% of bromine.

(b) 14.5 g of 2-aminoanthraquinone are added at 110° to 19.5 g of this product in 320 ml of phenol and the mixture is warmed at 150° for 5 hours. The mixture is diluted with 320 ml of methanol, and the product is filtered off at 50° with suction, washed with methanol and dried. 28.2 g of a product are obtained which dyes cotton in olive-green shades and which is markedly less yellowish-tinged than the product obtained according to Example 1. Cl content: 0.3%, bromine content: 9.0%.

EXAMPLE 3

The procedure described in Example 1 is followed, but, instead of 89.9 g of 2-amino-3,4-phthaloyl-7-bromoacridone, 73 g of 2-amino-3,4-phthaloylacridone are used. 167 g of a dyestuff are obtained which dyes cotton in fast olive-green shades, by all dyeing methods.

EXAMPLE 4

(a) 18.5 g = 0.1 mol of cyanuric chloride are added at 50°–60° to 22.3 g of 1-aminoanthraquinone (98% strength) = 0.1 mol in 250 ml of dry nitrobenzene. The mixture is warmed to 130° in the course of 30 minutes, maintained at this temperature until amine can no longer be detected by chromatography (about 20–30 minutes required) and stirred until cold, and the product is filtered off with suction, washed with a little cold nitrobenzene and plenty of acetone, and dried at 60°. 36 g = 97% of theory of 2-anthraquinonylamino(1)-4,6-dichlorotriazine are obtained. Cl content: 19.0%.

(b) 21 g of 2-amino-3,4-phthaloyl-7-bromoacridone are added to 18.6 g of the product obtained in (a) in 350 ml of nitrobenzene and the mixture is heated at 190°–195° until a removed sample only shows a trace of amine (about 2 hours are required). The mixture is diluted with 350 ml of ethanol and filtered boiling hot with suction, and the product is washed with hot ethanol and dried. 32.2 g of 2-anthraquinonylamino(1)-4-(3,4-phthaloyl-7-bromo)-acridonylamino(2)-6-chloroanthraquinone are obtained. Cl content: 4.4%, Br content: 10.8%.

(c) 18.9 g of the product obtained in (b) are stirred with 8.6 g of 1-amino-4-benzoylaminoanthraquinone, in 220 ml of phenol, at 150° until only a little amine can still be detected by chromatography (about 6 hours are required). Phenol is distilled off with steam, and the dyestuff is filtered off from the remaining suspension and dried. 26.3 g of 2-anthraquinonylamino(1)-4-(3,4-phthaloylamino-7-bromo)-acridonylamino(2)-6-(4-benzoylamino)-anthraquinonylamino(1)-triazine are obtained. Cl content: 0.5%, Br content: 7.6%.

After having been brought into a finely dispersed form, this product dyes cotton, from a warm vat, in a grey shade.

EXAMPLE 5

11.3 g of the product obtained in Example (2a) are warmed with a mixture of 6.2 g of 1-amino-4-benzoylaminoanthraquinone and 4.1 of 1-aminoanthraquinone, in 120 ml of phenol, for 3 hours at 145°–150°. Subsequently the reaction mixture is distilled with steam until all the phenol has been driven off. The aqueous dyestuff suspension is filtered, and the product is washed with hot water and dried. 20.0 g of a blackish product are obtained. Cl content: 0.5%; bromine content: 8.5%.

After having been brought into a finely divided form, this product dyes cotton in a fast neutral grey shade.

EXAMPLE 6

(a) A mixture of 10 g of 7-bromo-3,4-phthaloyl-2-aminoacridone, 3.85 g of 1-aminoanthraquinone, 5.8 g of 1-amino-4-benzoylaminoanthraquinone and 3.7 g of cyanuric chloride—this corresponds to a molar ratio of the components of 1.2:0.85:0.85:1—is stirred in 120 ml of dry phenol for 3 hours at 140°–142°, the reaction mixture is then subjected to steam distillation, and the dyestuff is filtered off from the remaining suspension and is washed and dried. 20.8 g of a black powder are obtained which, after having been brought into a finely divided form, dyes cotton in an intense neutral grey shade.

(b) The procedure described in (a) is followed, but the following mixture is used: 10 g of 7-bromo-3,4-phthaloyl-2-aminoacridone, 3.2 g of 1-aminoanthraquinone, 6.8 go 1-amino-4-benzoylaminoanthraquinone and 3.7 g of cyanuric chloride—this corresponds to a molar ratio of the components of 1.2:0.7:1.0:1.0. 21.3 g=99% of theroy are obtained. This product dyes cotton in a markedly reddish-tinged grey shade.

(c) The procedure described in (a) is followed, but the following mixture is used: 10 g of 7-bromo-3,4-phthaloyl-2-aminoacridone, 4.6 g of 1-aminoanthraquinone, 4.7 g of 1-amino-4-benzoylaminoanthraquinone and 3.7 g of cyanuric chloride—this corresponds to a molar ratio of the components of 1.2:1.0:0.7:1.0. 20.5 g=98% of theory are obtained. This product dyes cotton in an olivegrey shade.

(d) The experiments (a)–(c) are repeated, but instead of 1-aminoanthraquinone the same amount of crude 1-aminoanthraquinone is used, which has the following analytical composition: 72.5% of 1-aminoanthraquinone, 5.9% of 2-aminoanthraquinone, 3.1% of 1,5-diaminoanthraquinone, 3.0% of 1,6-diaminoanthraquinone, 3.1% of 1,7-diaminoanthraquinone, 2.8% of 1,8-diaminoanthraquinone and 2.3% of anthraquinone, and which was obtained according to Example 1 of German Offenlegungsschrift No. 2,749,889. Products are obtained, in comparable yields, which, brought into a finely divided form, likewise dye cotton in intense shades.

(e) The procedure described in (a) is followed, but the following mixture is used: 11.7 g of 7-bromo-3,4-phthaloyl-2-aminoacridone, 3.4 g of 1-aminoanthraquinone, 5.1 g of 1-amino-4-benzoylaminoanthraquinone and 3.7 g of cyanuric chloride—this corresponds to a molar ratio of 1.4:0.75:0.75:1. 21.9 g—100% of theory are obtained. This product dyes cotton in an intensely bluish-tinged grey shade.

EXAMPLE 7

(a) 22.0 g of 1-aminoanthraquinone are stirred in 200 ml of phenol and 19 g of cyanuric chloride at 60°–65° until only a trace of amine can still be detected by chromatography (about 5–6 hours are required). The mixture is diluted with 200 ml of acetone and filtered with suction at 40°–50°, and the product is washed with acetone and dried. 30.3 g of 2-anthraquinonylamino(1)-4,6-dichlorotriazine are obtained. Chlorine content: 17.7%.

(b) 18.6 g of the product (=0.05 mol) obtained in (a) are stirred with 33.5 g of 2-amino-3,4-phthaloylacridone (0.1 mol) at 145°–150° until only minor residual amounts of amine are still detectable by chromatography. Phenol is then removed from the product in a vacuum cabinet, and the product is stirred in hot water, filtered off and dried. 48.5 g of a dyestuff are obtained. Cl content: 0.4%. It dyes cotton in an intensely bluish-tinged olivegrey shade.

EXAMPLE 8

(a) 40.9 g (=0.1 mol) of 5,7-dichloro-3,4-phthaloyl-2-aminoacridone are stirred with 18.4 g of cyanuric chloride (=0.1 mol) in 400 ml of nitrobenzene for 1 hour at 130°, the mixture is then stirred until it has cooled off, and the product is filtered off with suction, washed in turn with nitrobenzene and cold methanol and dried in vacuo at room temperature. 47.4 g are obtained; chlorine content=23.4%.

(b) 10 g of the product obtained in (a) are stirred with 8 g of 2-aminoanthraquinone in 150 ml of phenol for 1 hour at 110° and for 1 hour at 150°. The mixture is then diluted with 150 ml of pyridine, and the product is filtered off with suction at 100°, washed with pyridine and methanol and dried. 14.6 g are obtained; Cl content: 8.8%. Cotton is dyed in olive-tinged green shades.

EXAMPLE 9

6 g of cyanuric chloride are added to 13.5 g of 2-amino-3,4-phthaloyl-7-bromoacridone in 175 ml of nitrobenzene at 110° and the mixture is stirred for 2 hours at 130°. (Halogen content of a worked-up sample: 11.5% of Cl; 14.0% of bromine). 12.5 g of 1-aminoanthraquinone and 150 ml of phenol are now added and the mixture is warmed to 150° and kept at this temperature for 5 hours. The solvents are then removed by distillation in vacuo, and the residue is boiled with hot water and dried. 24.5 g are obtained; chlorine content 0.5%; bromine content 8.8%.

EXAMPLE 10

The procedure described in Example 6a is followed, but instead of 1-aminoanthraquinone the same amount of 2-aminoanthraquinone is used. After working up in the same way, 21.4 g of a dyestuff are obtained; Cl content: 0.6%, bromine content: 9.1%. The dyestuff dyes cotton in a grey shade, from the vat, at 50°–55° C.

EXAMPLE 11

11.3 g of 2-(3,4-phthaloyl-7-bromo)-acridonylamino(2)-4,6-dichlorotriazine, obtained according to Example 2a, are stirred with 4 g of 1-aminoanthraquinone and 6.1 g of 1-amino-5-benzoylaminoanthraquinone in 160 ml of phenol for 3 hours at 150° C. The phenol is then driven off with steam, and the dyestuff is filtered off, washed and dried. 19 g are obtained. Cl content: 0.8%, bromine content: 8.0%. Brought into a finely divided form, the product dyes cotton, from the vat, in a deep brownish-tinged olive-green shade.

EXAMPLE 12

18.5 g of cyanuric chloride are added at 60° to a mixture of 50.3 g of 2-amino-3,4-phthaloyl-7-bromoacridone, 17.1 g of 1-amino-4-benzoylaminoanthraquinone and 27.4 g of an aminoanthraquinone mixture of the following composition: 1-aminoanthraquinone: 40.1%, 2-aminoanthraquinone: 22.5%, 1,5-dimainoanthraquinone: 2.8%, 1,8-diaminoanthraquinone: 5.8%, 1,6-diaminoanthraquinone: 3.6%, 1,7-diaminoanthraquinone: 3.9% and anthraquinone: 12.4% (obtained by NaSH reduction of a nitroanthraquinone mixture, which was isolated from the mother liquor of the 1-nitroanthraquinone purification according to the process of German Offenlegungsschriften No. 2,343,977/78; the remainder to add up to 100% is unidentified) in 600 ml of phenol. The mixture is warmed, with stirring, at a uniform rate to 140° in the course of 2 hours. Stirring is continued at this temperature for about 2 hours until only traces of 2-amino-3,4-phthaloyl-7-bromoacridone an 1-amino-4-benzoylaminoanthraquinone can still be detected by chromatography.

The phenol is driven off with steam, the resulting suspension is filtered with suction and the product is washed with hot water until acid-free. 154 g of a presscake are obtained, which contains 99.6 g of a dyestuff (98% of theory). Chlorine content: 0.6%; bromine content: 9.0%. 10 g of a customary dispersing agent are added to 7.74 g of the presscake (containing 5 g of dyestuff) and the mixture is made up with water to 100 g. The resulting dispersion is ball-milled for 12 hours. The approximately 5% strength dyestuff paste obtained dyes cotton in a deep olive-grey shade, from a warm vat at 50°–55° C.

We claim:

1. A compound selected from the compounds of the formula

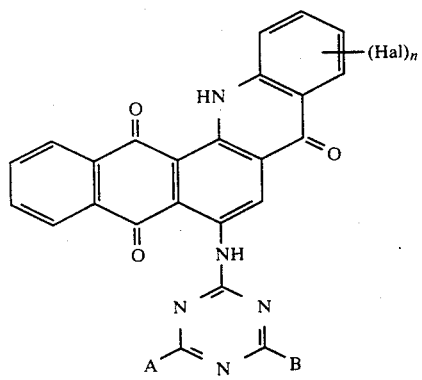

(I)

wherein A represents —NHV, —NHW or —NHZ and B represents —NHW or —NHZ, in which

V represents a radical of the formula

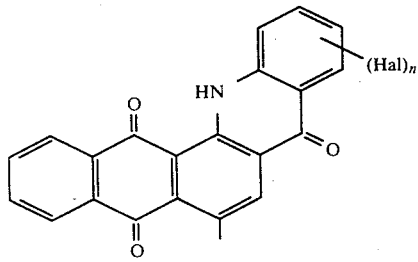

W represents a radical of the formula

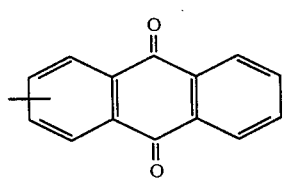

and Z represents a radical of the formula

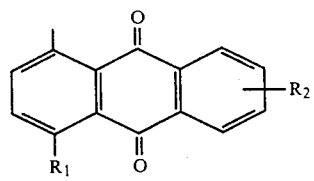

$R_1$ and $R_2$ are hydrogen or $C_{1-4}$ alkylcarbonylamino, but do not simultaneously denote $C_{1-4}$ alkylcarbonylamino, Hal is a halogen atom and n is a halogen atom and n is the numbers 0, 1 or 2.

2. A mixture of compounds of the formula

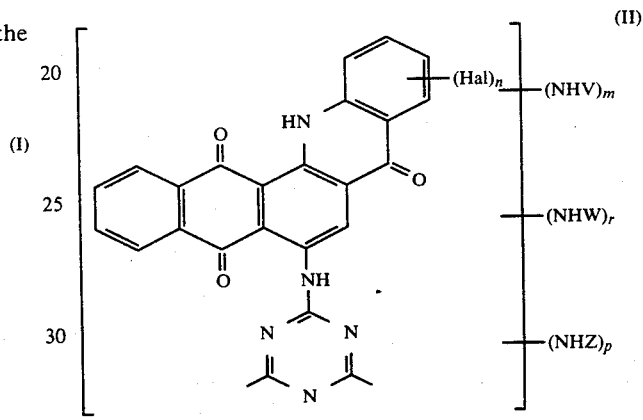

(II)

wherein

V represents a radical of the formula

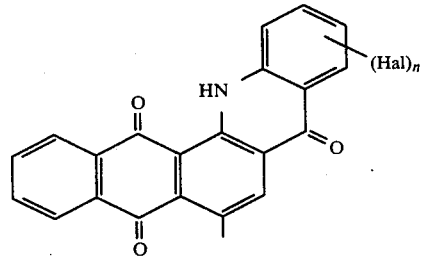

W represents a radical of the formula

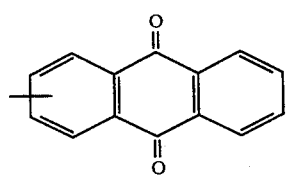

and Z represents a radical of the formula

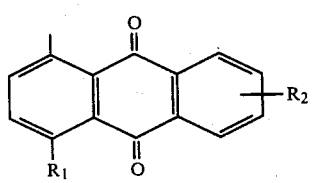

the moieties NHV, NHW and NHZ being disposed at the 3 or 5 position of the triazinyl moiety and Hal represents halogen, $R_1$ and $R_2$ are hydrogen or $C_1$–$C_4$ alkyl carbonyl amino, but do not simultaneously denote $C_1$–$C_4$ alkyl carbonyl amino, m represents a number from 0 to 0.5 and r and p independently of one another represent a number from 0.5 to +1.5, with the sum m−r+p being 2.

3. Compounds according to claim 1, characterised in that p is o, m is 0 to 0.2 and r is 1.8–2.0, with the sum m+r being 2.

4. Compound according to claim 1, characterised in that

Hal is bromine, $R_1$ is benzoylamino which may be substituted by Cl, Br, $C_1$–$C_4$-alkyl, $OCH_3$, $CF_3$ or $NO_2$, and n represents 0 or 1.

* * * * *